July 13, 1926. 1,592,242
K. H. P. WELSCH
DEVICE FOR TRIPPING THE BLADES OF WIND AND WATER WHEELS
Filed July 10, 1925
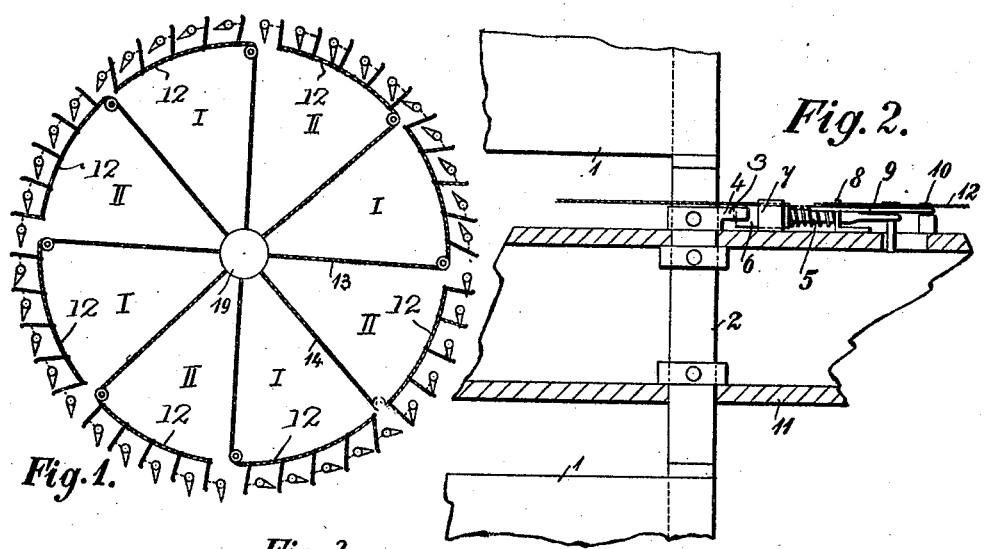
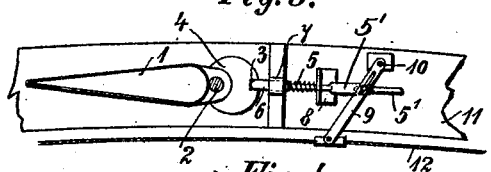
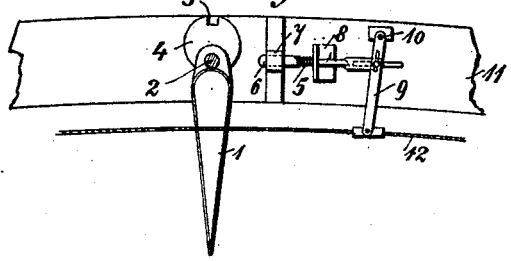
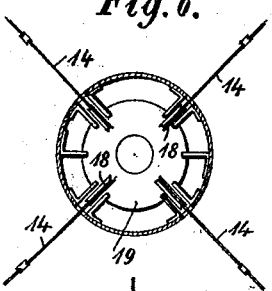
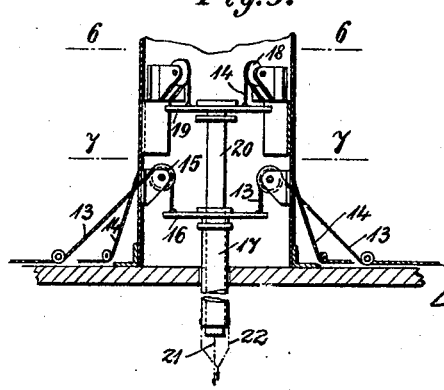
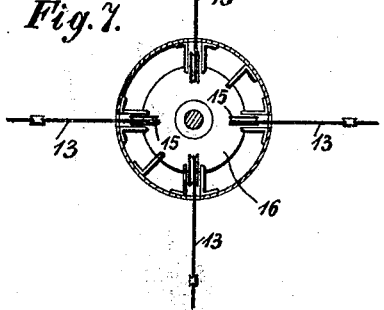
Inventor
K. H. P. Welsch Patented July 13, 1926.

1,592,242

UNITED STATES PATENT OFFICE.

KARL HERMANN PAUL WELSCH, OF HAMBURG, GERMANY.

DEVICE FOR TRIPPING THE BLADES OF WIND AND WATER WHEELS.

Application filed July 10, 1925, Serial No. 42,840, and in Germany August 19, 1924.

The present invention refers to a device for stopping wind and water wheels having blades arranged parallel to the axes of the wheel. This device consists of latches or sliding bolts, one latch being provided for each blade. Each latch is spring-pressed and engages a notched member arranged on the shaft of the blade to lock the shaft and thus hold the blade in its working position. Each latch is provided with pull operating means which reaches to the stand of the operator so as to enable one from this place to withdraw the latches from engagement with the shafts of the blades, and thus trip the blades, whereupon the latter can no longer tend to rotate the wheel under the action of the force of wind or water. When the operating means is released the latch under the action of its spring can again engage a notched member as soon as it coincides with it so as to lock the shaft and thus again hold the blade in its working position. Preferably the operating means are connected with one another to form groups in such a manner that by pulling one member a complete group of blades can be tripped together.

In the drawing Fig. 1 is a diagrammatical plan view of the wind and water wheel, the various blades being interconnected to form groups.

Fig. 2 is a view of a tripping device, the blades being shown broken off, and the rim of the wheel being shown in section.

Figs. 3 and 4 are plan views of a tripping device in two different positions.

Fig. 5 is a sectional diagrammatical view of the means for operating the tripping device.

Fig. 6 is a section on line 6—6 of Fig. 5, and

Fig. 7 is a section on line 7—7 of Fig. 5.

The shaft 2 of the blades 1 is provided with a notch 3 preferably by making use of a disk-like hub 4, which in the construction shown is arranged eccentrically on the shaft 2. A latch 6, slidably guided on the rim or curb of the wheel, is connected with a spring 5 tending to hold the latch 6 in engagement with the notch 3 on the hub 4. For guiding the latch 6 two brackets 7 and 8 are mounted on the rim. A prolongation 5' of the latch has a slot and pin connection with a lever 9, which is rotatively connected by a pin 10 to the rim or curb 11. The free end of the lever 9 is engaged preferably by a wire rope 12, which is led up to the stand of the operator. In the construction shown five latches 6 are connected with each wire rope 12 and the wire ropes 12 are each connected with a rope 13 or 14. By pulling the ropes 13 and 14 the connected levers 9 will be moved from the position shown in Fig. 3 to the position shown in Fig. 4, in which the latches 6 are pulled out of the notches 3 of the shaft hubs 4, thus tripping the blades so that they no longer can offer any resistance to the force of the wind or water but swing out in the direction of the stream or current, Fig. 4.

When all the draw-ropes 13 and 14 are pulled all blades will be tripped so that the wheel is stopped. It is however preferable, as is shown in the drawing, to construct the device in such a manner that the blades can be tripped in groups. Thus the blades of group I are interconnected, and those of group II are separately interconnected, so that each group can be released independently, and the operator is thus enabled to trip, for example, one-half of the complete number of blades, and allow the other half of the blades to operate, thus allowing the wheel to work at half power.

Each rope 13 of the group I blades as indicated in Fig. 1, passes over a roller 15 and is connected to a plate 16 embracing a vertically movable tube 17. In a similar manner the ropes 14 of the group II blades as indicated in Fig. 1, passes over a roller 18 to a plate 19 which is connected, preferably rotatably, with a spindle 20. The spindle 20 telescopes within the tube 17 and is connected with an operating rope 21, while the tube 17 is connected in a similar manner with an operating rope 22. When the operator pulls on either the rope 22 or the rope 21 all the blades of the group I or of the group II respectively, will be tripped. When the operator pulls on both ropes 22 and 21 all the blades are tripped and thus the wheel is stopped.

When thereupon the ropes are released the latches 6, owing to their springs 5, will be moved forward again. At first single latches will engage with such corresponding notches 3 as happen to be in position therefor, that is those notches which at that moment are tangential to the rim 11. Upon the slightest wind these blades will start to move the wheel, whereupon the notches of the other blades will coincide with the corresponding latches, thus allowing these latches also to lock the blades in position with regard to the wheel, which blades are then enabled to transmit power to the wheel, and in the same manner one by one the other blades will be locked, until all blades are again in operative position.

I claim:

1. A device for stopping wind and water wheels which have blades arranged parallel to the axis of the wheel, comprising, a spring-pressed latch guided rectangularly to the shaft of each blade, a notched part on the shaft of each blade, each latch being arranged to engage in a notch, and operating means for withdrawing the latches from the notches.

2. A device according to claim 1, the operating means being connected to separate groups of blades whereby to enable complete groups of blades to be acted on together.

3. A device according to claim 1, a notched hub on the shaft of each blade constituting the notch part.

4. A device according to claim 1, a notched hub in the form of an eccentric disk on the shaft of each blade constituting the notched part.

5. A device according to claim 1, the operating means, comprising, for each latch, a lever, a pin and slot connection between the lever and the latch, and a rope engaging the levers.

In testimony whereof I have signed my name to this specification.

KARL HERMANN PAUL WELSCH.